(12) United States Patent
Jung et al.

(10) Patent No.: US 9,998,442 B2
(45) Date of Patent: Jun. 12, 2018

(54) METHOD AND APPARATUS FOR SHARING OF CONTENT

(71) Applicant: Samsung Electronics Co., Ltd., Gyeonggi-do (KR)

(72) Inventors: Jong-woo Jung, Gyeonggi-do (KR); In-sik Myung, Incheon (KR); Ye-seul Hong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 72 days.

(21) Appl. No.: 14/884,870

(22) Filed: Oct. 16, 2015

(65) Prior Publication Data
US 2016/0112392 A1    Apr. 21, 2016

(30) Foreign Application Priority Data

Oct. 17, 2014    (KR) .................... 10-2014-0141236

(51) Int. Cl.
| | |
|---|---|
| *H04L 29/06* | (2006.01) |
| *H04N 21/258* | (2011.01) |
| *H04N 21/2743* | (2011.01) |
| *H04N 21/41* | (2011.01) |
| *H04N 21/414* | (2011.01) |

(Continued)

(52) U.S. Cl.
CPC .......... *H04L 63/08* (2013.01); *H04L 67/1002* (2013.01); *H04N 21/25816* (2013.01); *H04N 21/25875* (2013.01); *H04N 21/2743* (2013.01); *H04N 21/4122* (2013.01); *H04N 21/41407* (2013.01); *H04N 21/4532* (2013.01)

(58) Field of Classification Search
CPC ............... H04L 63/08; H04L 67/1002; H04N 21/25816; H04N 21/25875; H04N 21/2743; H04N 21/41407; H04N 21/4532; H04N 21/4122
See application file for complete search history.

(56) References Cited

U.S. PATENT DOCUMENTS

| | | |
|---|---|---|
| 7,689,700 B2 | 3/2010 | McNeil et al. |
| 8,353,052 B2 | 1/2013 | Larsson et al. |

(Continued)

FOREIGN PATENT DOCUMENTS

| | | |
|---|---|---|
| CN | 101924786 A | 12/2010 |
| CN | 103348373 A | 10/2013 |

(Continued)

OTHER PUBLICATIONS

European Search Report dated Feb. 16, 2016.

(Continued)

*Primary Examiner* — Mahfuzur Rahman
(74) *Attorney, Agent, or Firm* — Cha & Reiter, LLC

(57) ABSTRACT

A device comprising: a display; a communication interface; and at least one processor configured to: receive from an external device, via the communication interface, authentication information associated with a user of the external device; transmit the authentication information to a server; transmit a request for content to the server when the device is successfully authenticated by the server based on the authentication information; receive the content from the server; and control the display to display the content.

16 Claims, 21 Drawing Sheets

(51) Int. Cl.
*H04N 21/45* (2011.01)
*H04L 29/08* (2006.01)

(56) References Cited

U.S. PATENT DOCUMENTS

| | | |
|---|---|---|
| 8,576,846 B2 | 11/2013 | Kumar et al. |
| 8,776,177 B2 | 7/2014 | Ferren et al. |
| 9,071,967 B1 | 6/2015 | Davies et al. |
| 9,319,223 B2 | 4/2016 | Nix |
| 9,344,485 B2 | 5/2016 | Smadi et al. |
| 9,473,938 B2 | 10/2016 | Miao et al. |
| 2001/0032153 A1* | 10/2001 | Miller ............ G06Q 10/02 705/28 |
| 2005/0114650 A1* | 5/2005 | Rockwood ........ H04L 63/08 713/155 |
| 2006/0164208 A1* | 7/2006 | Schaffzin ........ G08B 29/181 340/5.64 |
| 2008/0034081 A1 | 2/2008 | Marshall et al. |
| 2008/0289006 A1* | 11/2008 | Hock ............ H04L 63/08 726/4 |
| 2009/0119780 A1* | 5/2009 | Ham ............ G06F 21/10 726/26 |
| 2009/0222659 A1 | 9/2009 | Miyabayashi et al. |
| 2009/0234878 A1* | 9/2009 | Herz ............ G06Q 20/383 |
| 2010/0124213 A1 | 5/2010 | Ise et al. |
| 2010/0269157 A1* | 10/2010 | Experton ........ G06F 19/322 726/4 |
| 2010/0274859 A1* | 10/2010 | Bucuk ............ H04L 63/08 709/206 |
| 2010/0319052 A1 | 12/2010 | Ferren et al. |
| 2011/0167444 A1 | 7/2011 | Sun et al. |
| 2012/0166538 A1 | 6/2012 | Son et al. |
| 2013/0024515 A1 | 1/2013 | Parker |
| 2013/0034090 A1 | 2/2013 | Thomas et al. |
| 2013/0036231 A1 | 2/2013 | Suumaki |
| 2013/0107806 A1 | 5/2013 | Lee et al. |
| 2013/0124617 A1 | 5/2013 | Lee et al. |
| 2013/0185806 A1 | 7/2013 | Hatakeyama |
| 2013/0191883 A1 | 7/2013 | Tung |
| 2013/0337803 A1 | 12/2013 | Christopher et al. |
| 2013/0347073 A1 | 12/2013 | Bryska et al. |
| 2014/0035952 A1* | 2/2014 | Mikuni ............ G06T 19/006 345/633 |
| 2014/0075523 A1 | 3/2014 | Tuomaala et al. |
| 2014/0113549 A1 | 4/2014 | Beg et al. |
| 2015/0103770 A1 | 4/2015 | Chang et al. |
| 2015/0119000 A1 | 4/2015 | Miao et al. |
| 2015/0119060 A1 | 4/2015 | Aoyagi et al. |
| 2015/0124791 A1 | 5/2015 | Mazandarany et al. |
| 2016/0183180 A1 | 6/2016 | Garcia et al. |
| 2016/0234690 A1 | 8/2016 | Michalski et al. |

FOREIGN PATENT DOCUMENTS

| | | |
|---|---|---|
| CN | 103441997 A | 12/2013 |
| CN | 103475754 A | 12/2013 |
| CN | 104106062 A | 10/2014 |
| EP | 2 624 616 A1 | 8/2013 |
| KR | 10-2013-0047300 A | 5/2013 |
| KR | 10-2013-0057617 A | 6/2013 |
| WO | 2012/129400 A2 | 9/2012 |
| WO | 2014/036689 A1 | 3/2014 |

OTHER PUBLICATIONS

"Wi-Fi Simple Configuration Technical Specification"; 2011; Version 2.0.2; Wi-Fi Alliance; XP055050847.
European Search Report dated Feb. 21, 2018.
Chinese Search Report dated Feb. 26, 2018.

* cited by examiner

METHOD AND APPARATUS FOR SHARING OF CONTENT

CLAIM OF PRIORITY

This application claims the benefit of priority under 35 U.S.C. § 119 from Korean Patent Application No. 10-2014-0141236, filed on Oct. 17, 2014, in the Korean Intellectual Property Office, the disclosure of which is incorporated herein by reference in its entirety.

BACKGROUND

1. Field of the Disclosure

The present disclosure relates to electronic devices in general, and more particularly to a method and apparatus for sharing of content.

2. Description of the Related Art

With the increase of an amount of contents and the development of communications technologies, a cloud service is provided recently. The cloud service refers to a service for storing diverse contents in a server and downloading the contents from the server anywhere and at any time by using an electronic device, such as, a smartphone.

An existing public cloud service, out of the cloud service, has a structure where a server having a fixed infrastructure is provided, and a client (for example, an electronic device) may access a server through a fixed Internet identifier (for example, an Internet Protocol (IP) address or domain). In addition, an existing Network Attached Storage (NAS) systems is a sharing storage system on a network, which may upload, download, and share a content by using an electronic device inside or outside.

In order for a user to use the conventional cloud service described above, the user needs to perform an initial setting process for setting account information. Specifically, the conventional cloud service uses a cloud server for common use in many cases, and thus, a privacy issue may occur.

In addition, user demand for sharing a content by using diverse devices is increasing. Accordingly, there is a growing need for a method for enabling users to share various types of contents in diverse devices more easily.

SUMMARY

The present disclosure addresses this need. According to aspects of the disclosure, a device is provided comprising: a display; a communication interface; and at least one processor configured to: receive from an external device, via the communication interface, authentication information associated with a user of the external device; transmit the authentication information to a server; transmit a request for content to the server when the device is successfully authenticated by the server based on the authentication information; receive the content from the server; and control the display to display the content.

According to aspects of the disclosure, a device is provided comprising: a communication interface; and at least one processor configured to: control the communication interface to transmit content to a server, establish a connection with an external device capable of displaying the content, and transmit authentication information to the external device.

According to aspects of the disclosure, a method is provided for sharing of content, comprising: establishing a connection between a first device and a second device; receiving, by the first device, authentication information associated with a user of the second device; transmitting the authentication information to a server; receiving, by the first device, a content that is transmitted by the server when the user is successfully authenticated by the server based on the authentication information; and displaying the content on a display of the first device.

According to aspects of the disclosure, a method is provided for sharing of content, the method comprising: transmitting, by a first device, content to a server; establishing a connection between the first device and a second device that is capable of displaying the content; and transmitting from the first device to the second device, authentication information associated with a user of the second device.

According to aspects of the disclosure, a content sharing system is provided comprising a first device, a second device, and a server, wherein: the first device is configured to transmit content to the server, establish a connection with the second device, and transmit, to the second device, authentication information associated with a user of the first device; the second device is configured to receive the authentication information from the first device, transmit the authentication information to the server, receive the content from the server when the user is authenticated successfully by the server based on the authentication information, and display the content; and the server is configured to receive the content from the first device, authenticate the user by using the authentication information, and in response to the user being authenticated, transmit the content to the second device.

According to aspects of the disclosure, a non-transitory computer-readable medium is provided that stores one or more processor-executable instructions, which when executed by at least one processor, cause the at least one processor to execute a process comprising the steps of: establishing a connection between a first device and a second device; receiving, by the first device, authentication information associated with a user of the second device; transmitting the authentication information to a server; receiving, by the first device, content that is transmitted by the server when the user is successfully authenticated by the server based on the authentication information; and displaying the content on a display of the first device.

BRIEF DESCRIPTION OF THE DRAWINGS

The above and/or other aspects of the present inventive concept will be more apparent by describing certain embodiments of the present inventive concept with reference to the accompanying drawings, in which.

DETAILED DESCRIPTION

Figure 1:
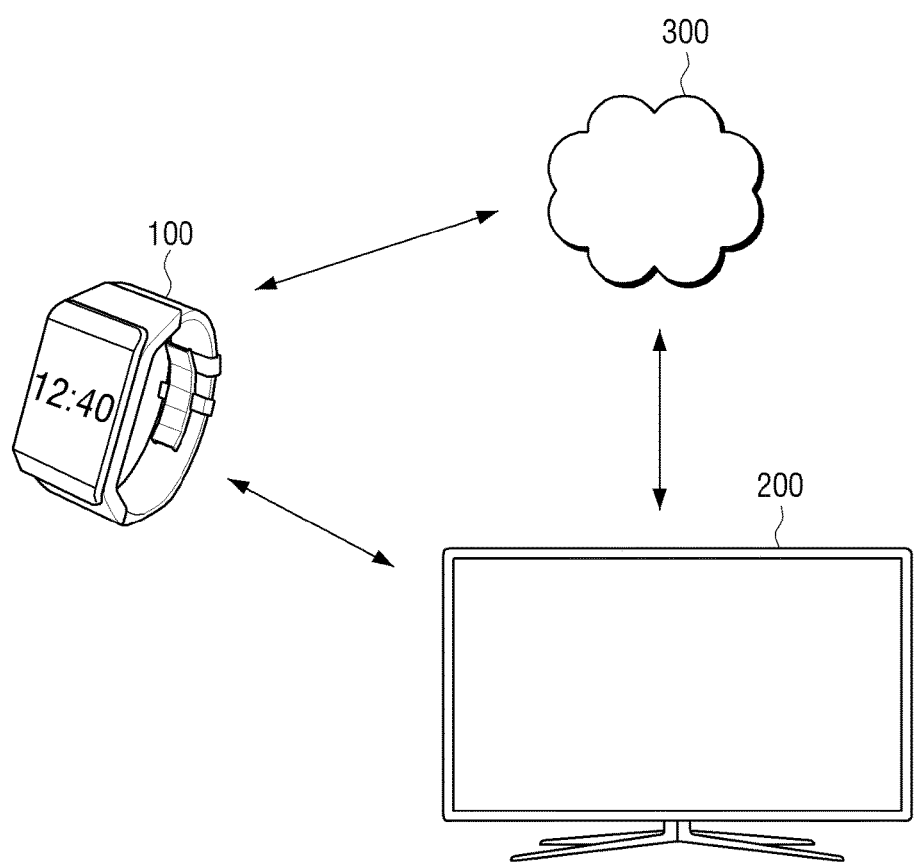
FIG. 1 is a diagram of an example of a system, according to an embodiment of the present disclosure.

Certain embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

FIG. 1 is a diagram of an example of a content sharing system, according to an embodiment of the present disclosure. As illustrated, the content sharing system includes a first device 100, a second device 200, and a cloud server 300.

The first device 100 or the second device 200 may include any suitable type of device such as a smartphone, a tablet Personal Computer (PC), a laptop PC, a Personal Digital Assistant (PDA), a smart television (TV), a navigation, a wearable device, etc. The first device 100 may be connected to the second device 200 and the cloud server 300. In operation, the first device 100 may transmit content to the cloud server 300, and may receive from the cloud server 300 other content.

The second device 200 may receive the content transmitted from the first device 100 to the cloud server 300. In instances in which user authentication is required in order for the second device 200 to access the cloud server 300, the user authentication may be performed by using user authentication information stored in the first device 100. An example of a user authentication process is discussed further below with respect to FIG. 4.

The second device 200 may display the received content on a display 240. Accordingly, a user is able to share the content stored in the first device 100 with the second device 200 easily and display the content on multiple devices.

Although in the example of FIG. 1, content is transmitted to the second device 200 through the cloud server 300, in some implementations, the content may be directly transmitted from the first device 100 to the second device 200.

Figure 2:
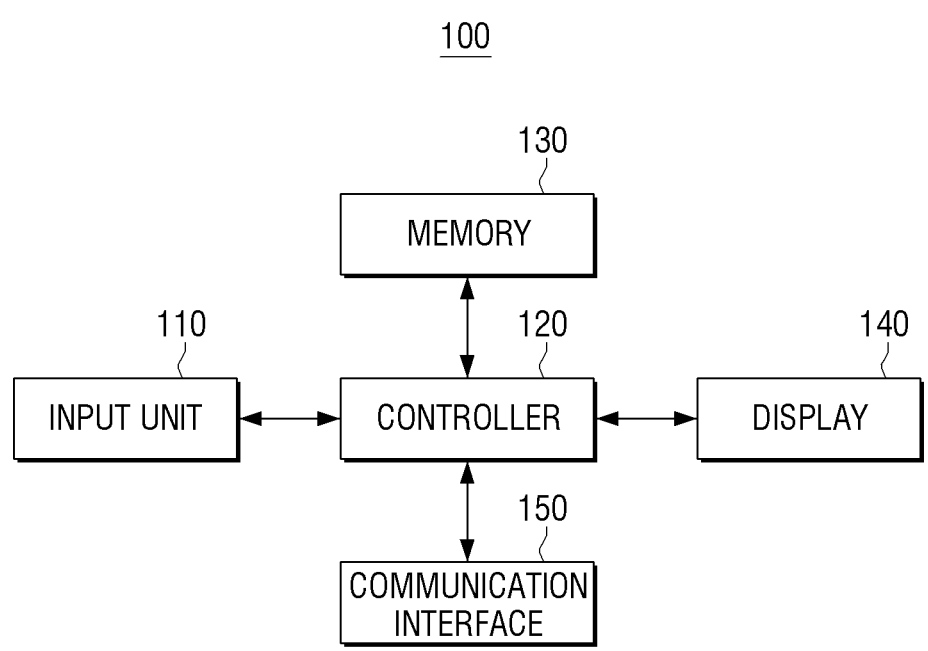
FIG. 2 is a block diagram of an example of a first device, according to an embodiment of the present disclosure.

FIG. 2 is a block diagram illustrating an example of the first device 100, according to an embodiment of the present disclosure. As illustrated, the first device 100 includes an input unit 110, a controller (or processor) 120, a memory 130, a display 140, and a communication interface 150. For example, the first device 100 according to an embodiment of the present disclosure may be a device which is capable of playing various types of content. As noted above, in some embodiments, the first device 100 may include any suitable type of device, such as a smartphone, a tablet PC, a smart TV, etc.

The input unit 110 may receive user commands for controlling the first device 100. According to an embodiment of the present disclosure, the input unit 110 may be implemented as a touch screen, but this is only an example. As can be readily appreciated, the input unit 110 may include any suitable type of input device, such as a mouse, a pointing device, a motion input unit, a button, etc.

The controller (or processor) 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The controller 120 may control the overall functioning of the first device 100 based on user commands inputted through the input unit 110. In some implementations, in response to detecting that the first device 100 is being connected to the second device 200, the controller 120 may cause the communication interface 150 to transmit user authentication information to the second device 200.

Additionally or alternatively, the controller 120 may transmit personal information stored in the memory 130 to the cloud server 300 in response to detecting that a connection between the first device 100 and the second device 200 is established. In some implementations, the controller 110 may cause the connection between the first device 100 and the second device 200 to be established, in response to detecting that the distance between the first device 100 and the second device 200 is shorter than a predetermined distance.

For example, the personal information may include a personal schedule of a user, for example, a location, a bedtime, a wake-up time, a meal time, etc. Additionally or alternatively, the personal information may include information on a health condition of the user. To be specific, the information may include total calorie intake for one day, consumed calories for one day, a running distance or walking distance, and a present health condition of the user (heart rate, blood pressure, liver somatic index, blood-sugar level, etc.)

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. In operation, the memory 130 stores various data and software modules for controlling the first device 100. In some implementations, the memory 130 may store the personal information on the user registered in the first device 100.

The display 140 may display various screens that the first device 100 may provide. In some implementations, the display 140 may display a content list and various User Interface (UI) screens relating to content sharing.

The display 140 may be implemented as a touch screen which forms a mutual layer structure with a touch pad so as to display various screens. Accordingly, in some implementations, the display 140 may be integrated with the input unit 110 in the same touchscreen unit. For example, the touchscreen unit may be one that is capable of detecting touch input location, touch input dimension(s), and touch pressure.

The communication interface 150 communicates with the second device 200 and the cloud server 300. In some implementations, in order to perform communication, the communication interface 150 may be implemented as at least one of a Near Field Communication (NFC) interface, a Wireless-Fidelity (Wi-Fi) interface, a Bluetooth interface, and a Zigbee interface. In addition, the communication 150 may use wireless communication in order to perform communication outside. For example, the communication interface 150 may use various communication standards, such as, Institute of Electrical and Electronics Engineers (IEEE), Zigbee, 3rd Generation (3G), 3rd Generation Partnership Project (3GPP), Long Term Evolution (LTE), etc.

Figure 3:
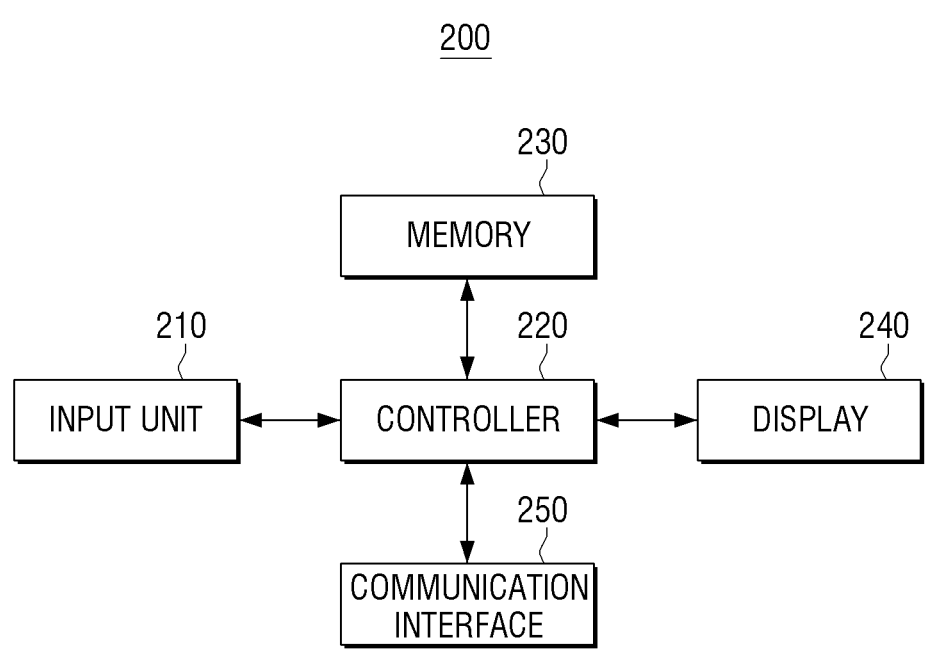
FIG. 3 is a block diagram of an example of a second device, according to an embodiment of the present disclosure.

FIG. 3 is a block diagram of an example of the second device 200, according to an embodiment of the present disclosure. As illustrated in FIG. 3, the second device 200 includes an input unit 210, a controller (or processor) 220, a memory 230, a display 240, and a communication interface 250. According to an embodiment of the present disclosure, the second device 200 may be a device which is capable of playing various types of content. The second device 200 may be any suitable type of device, such as a smartphone, a tablet PC, a smart TV, a desktop computer, a digital media player, etc.

The input unit 210 may receive a user command to control the second device 200. According to an embodiment of the present disclosure, the input unit 210 may be implemented as a touch screen, but this is only an example. For example, the input unit 210 may include any suitable type of input device, such as a mouse, a pointing device, a motion input unit, a button, etc.

The controller (or processor) 220 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the controller 220 may control the overall functioning of the second device 200 based on user commands inputted through the input unit 210. In some implementations in response to detecting that the second device 200 is being connected to the first device 100, the controller 220 may cause the communication interface 250 to receive user authentication information from the first device 100.

Additionally or alternatively, the controller 220 may perform user authentication in conjunction with the cloud server 300 by using the received user authentication information. An example of a user authentication process is discussed in further detail with reference to FIG. 6.

In operation, the controller 220 may transmit personal information stored in the memory 230 to the cloud server 300 in response to detecting that a connection is being established between the first device 100 and the second device 200. In some implementations, the controller 220 may cause the connection between the first device 100 and the second device 200 to be established in response to a distance between the first device 100 and the second device 200 being shorter than a predetermined distance.

For example, the personal information may include a personal schedule of a user, for example, a location, a bedtime, a wake-up time, a meal time, etc. Additionally or alternatively, the personal information may include information on a health condition of the user. To be specific, the information may include total calorie intake for one day, consumed calories for one day, a running distance or walking distance, and a present health condition of the user (heart rate, blood pressure, liver somatic index, blood-sugar level, etc.).

The controller 220 may control the communication interface 250 to receive personal preference information stored in the cloud server 300 and divide a content based on the received personal preference information. In addition, the controller 220 may obtain common preference information based on the received personal preference information and divide a content based on the identified common preference information.

The personal information preference information may include one or more indications of user preferences. For example, the personal preference information may include data indicating user interest in a product or environment based on a gender, age, an occupation, and the like of a user. For example, a male user in his twenties may a have high personal preference for a sports car, and a female user in her twenties may a have high personal preference for clothes of a heroine. In addition, a doctor may have a high personal preference for medical equipment.

The common preference information may be obtained by aggregating personal preference information associated with different users (associated with different devices) to find a preference that is shared among the users. Accordingly, the common preference information may include an indication of at least one preference that is shared among two or more of the users. For example, a male user and female user in their twenties may have a high common preference for clothes or a mobile phone and may have a low common preference for a pastoral house or a massager. In addition, male users in their twenties, thirties, and forties may have high a common preference for men's clothes and automobiles.

In some implementations, the personal preference information and/or the common preference information may include data which is pre-stored in at least one of the first device 100, the second device 200, or the cloud server 300 and may be updated by a user.

In addition, the preference information may be obtained by extracting metadata associated with each of a plurality of sub-contents constituting one content. The metadata may identify a gender, age, an occupation, and the like of a user who used the sub-content. In this regard, preference information for each of the sub-contents may be calculated based on the metadata extracted from each sub-content.

The user may evaluate a provided content, and the preference may be calculated by reflecting the user evaluation.

The memory 230 may include any suitable type of volatile or non-volatile memory, such as Random Access Memory (RAM), Read-Only Memory (ROM), Network Accessible Storage (NAS), cloud storage, a Solid State Drive (SSD), etc. In operation, the memory 230 stores various data and software modules for controlling the second device 200. In some implementations, the memory 230 may store the personal information on the user registered in the second device 200.

The display 240 may display various screens that the second device 200 may provide. In some implementations, the display 240 may display a content list and various User Interface (UI) screens relating to content sharing.

The display 240 may be implemented as a touch screen which forms a mutual layer structure with a touch pad so as to various screens. Accordingly, in some implementations, the display 240 may be integrated with the input unit 210 in the same touchscreen unit. For example, the touchscreen unit may be one that is capable of detecting touch input location, touch input dimension, and touch pressure.

The communication interface 250 communicates with the first device 100 and the cloud server 300. In some implementations, in order to perform communications, the communication interface 250 may include at least one of a Near-Field Communications (NFC) interface, a Wi-Fi interface, a Bluetooth interface, and a Zigbee interface. In addition, the communication 250 may use wireless communication in order to perform communication outside. For example, the communication interface 250 may use various communication standards, such as IEEE, Zigbee, 3G, 3GPP, LTE, and so on.

Figure 4:
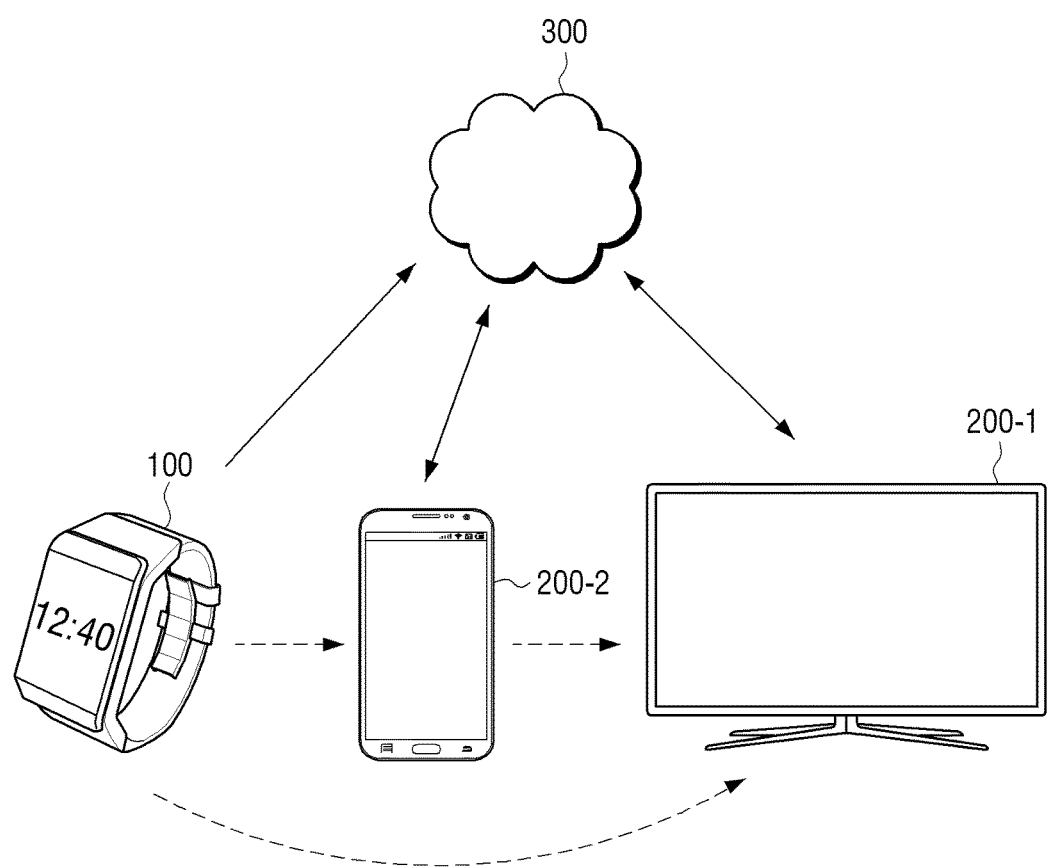
FIG. 4 is a diagram of an example of a system, according to an embodiment of the present disclosure.
Figure 5:
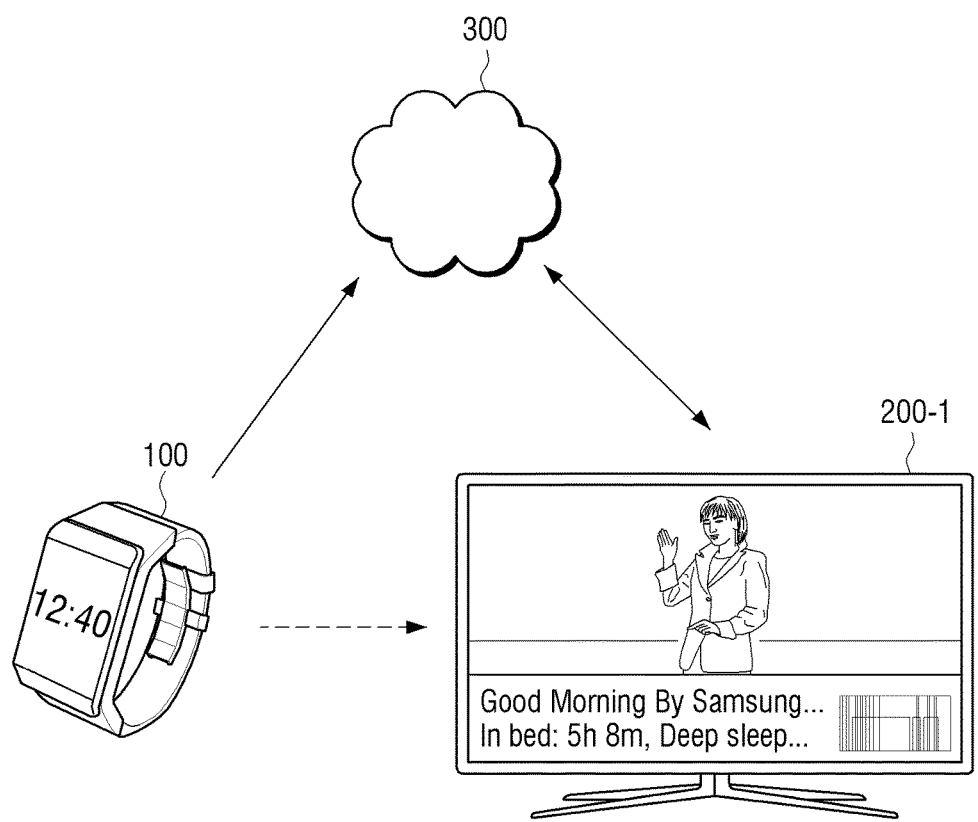
FIG. 5 is a diagram of an example of a system, according to an embodiment of the present disclosure.

FIGS. 4 and 5 are diagrams illustrating different examples of a system for sharing of content, according to various embodiments of the present disclosure.

As illustrated in FIG. 4, the system may include a first device 100 and second devices 200-1, 200-2 are a wearable device, a smartphone, and a smart TV, respectively, but this is only an example. That is, in the implementation, the first device 100 and the second devices 200-1, 200-2 may be realized as various devices such as a smartphone, a tablet PC, a wearable device, a smart TV, etc.

In response to the first device 100 being connected to second devices 200-1, 200-2, user authentication information may be transmitted from the first device 100 to a second device 200. Accordingly, the second device 200 may access a cloud server without passing through any authentication process (for example, an input process of an identification (ID) and a password).

Additionally or alternatively, as illustrated in FIG. 5, personal user information transmitted from the first device 100 to the cloud server 300 may also be directly transmitted to the second device 200 by the first device 100, after which the personal user information may be displayed on the second device.

Figure 6:
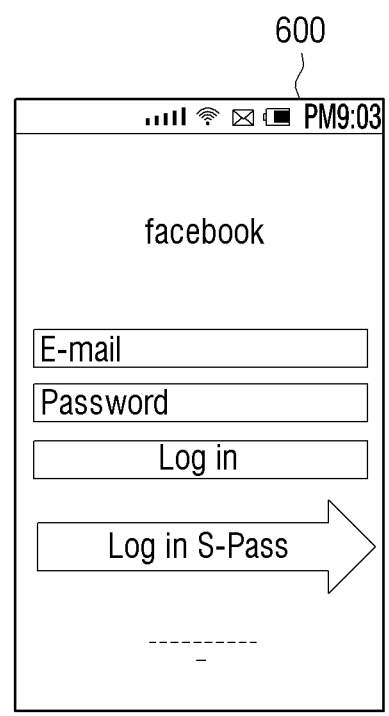
FIG. 6 is a diagram of an example of a log-in screen, according to an embodiment of the present disclosure.

As illustrated in FIG. 6, a user account needs to be authenticated through a log-in operation in general in order to perform user authentication. However, according to aspects of the present disclosure, user authentication information stored in a first device 100 is transmitted to a second device 200 over a connection that is established between the first device 100 and the second device 200 such that the user authentication of the second device 200 is performed automatically. For example, in response to the first device 100 being connected to the second device 200, Log in S-pass in a Facebook log-in screen 800 is performed, and thus, user authentication may be performed automatically.

Figure 7:
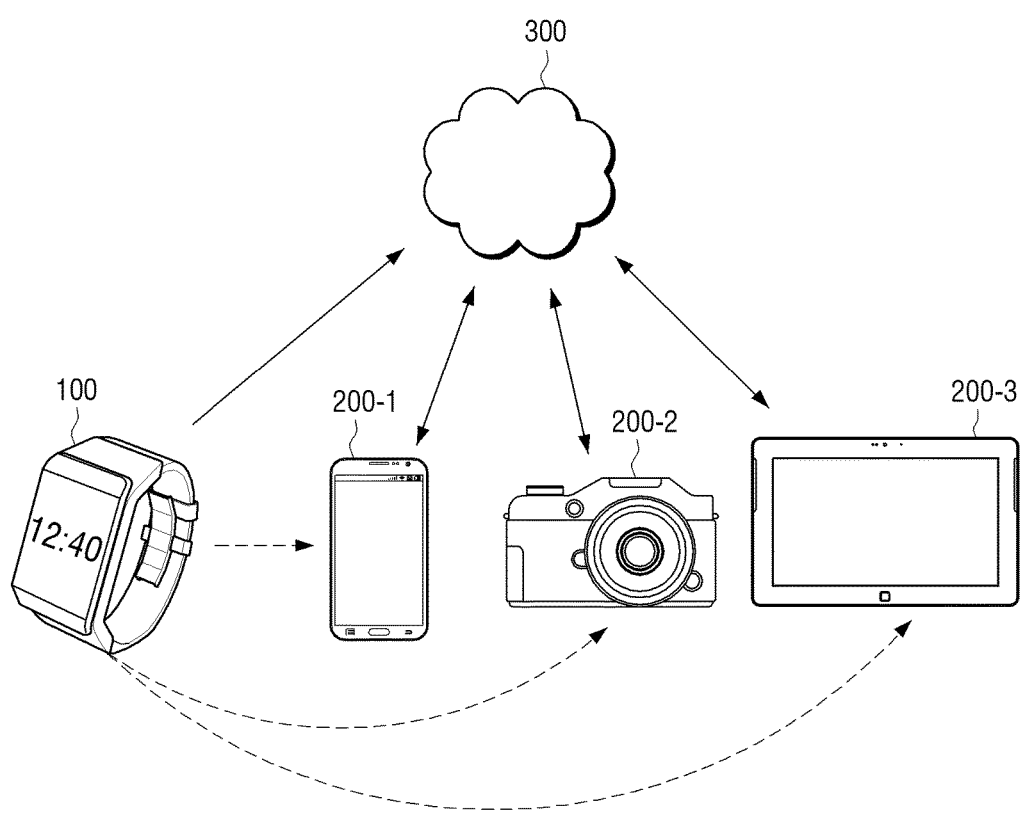
FIG. 7 is a diagram of an example of a system, according to an embodiment of the present disclosure.

Referring to FIG. 7, a first device 100 may be connected to a plurality of second devices 200-1, 200-2, 200-3. In this example, each of the plurality of second devices 200-1, 200-2, 200-3 may receive a content stored in a cloud server 300, and thus, the same content may be used in various devices.

Figure 8:
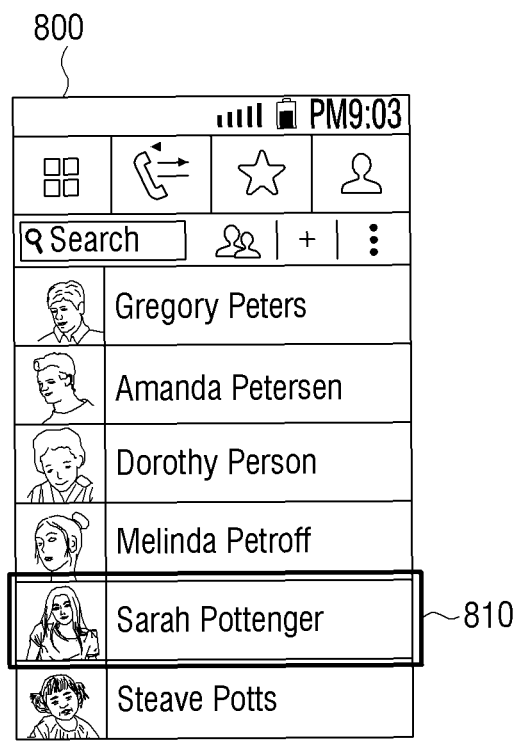
FIG. 8 is a diagram of an example of a contact list, according to an embodiment of the present disclosure.

In some implementations, the content may be shared by using a contact list 800 illustrated in FIG. 8. More specifically, in response to a particular person 810 being selected from the contact list 800, a content stored in a cloud server 300 may be transmitted to a second device 200 of the particular person and displayed therein. For example, a content may be transmitted to the second device 200 under certain conditions with respect to a first device 100 of the particular person. For example, a content may be transmitted to the second device 200 which is closest to the first device 100.

FIGS. 9, 10A, 10B, and 10C are diagrams of different systems for sharing of content, according to various embodiments of the present disclosure.

Figure 9:
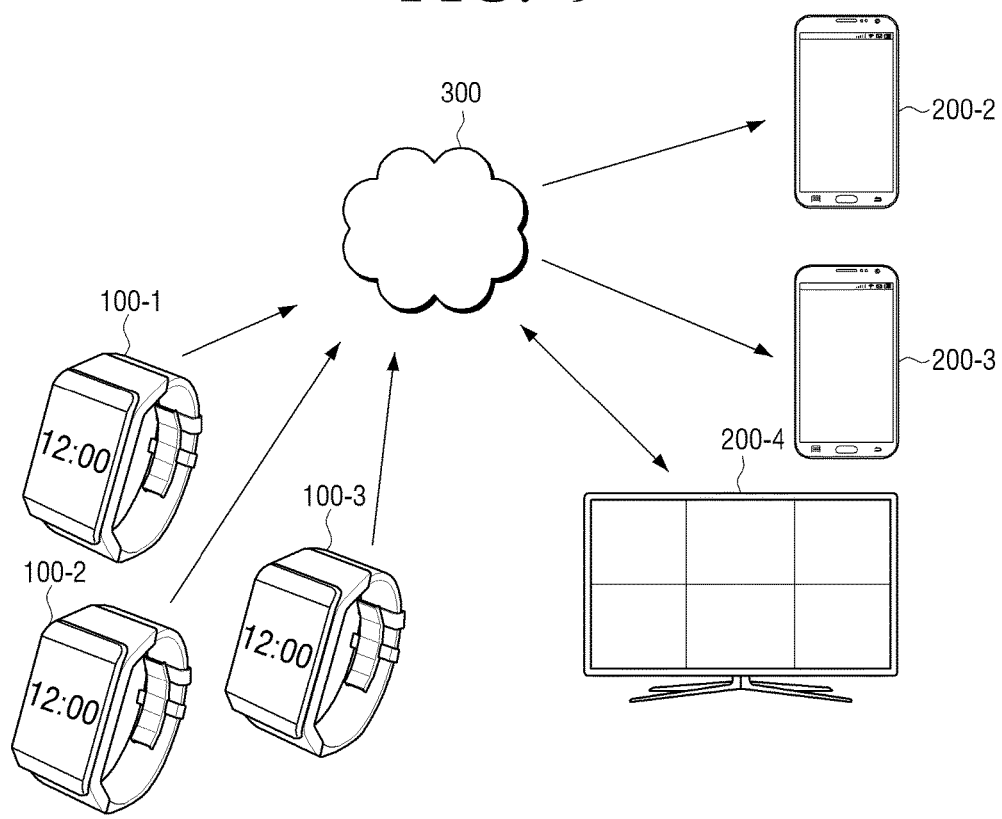
FIG. 9 is a diagram of an example of a system, according to an embodiment of the present disclosure.

More particularly, FIG. 9 is a diagram of a system implementing a method for transmitting a content based on personal preference information and/or common preference information in response to the plurality of first devices 100-1, 100-2, and 100-3.

According to aspects of the disclosure, the personal preference information may refer to data which shows user interest in a product or environment based on a gender, an age, an occupation, and the like of the user. For example, a male user in his twenties may have a high personal preference for a sports car, and a female user in her twenties may have a high personal preference for clothes of a heroine. In addition, a doctor may have a high personal preference for medical equipment.

The common preference information may be obtained by aggregating the personal preference information and finding preferences that different users have in common. For example, a male user and female user in their twenties may have a high common preference for clothes or a mobile phone and may have a low common preference for a pastoral house or a massager. In addition, male users in their twenties, thirties, and forties may have a high common preference for men's clothes and automobile.

As noted above, the personal preference information and the common preference information may be pre-stored in the first device 100, the second device 200, or the cloud server 300 and may be updated by a user.

According to aspects of the disclosure, contents transmitted from the plurality of first devices 100-1, 100-2, 100-3 are stored in the cloud server 300. More particularly, the content transmitted by any of the first devices to the cloud server 300 may be selected based on a characteristic of the second device. For example, any of the first devices 100 may determine the type of the second device (e.g., whether the second device 200 includes a public device 200-4 or personal devices 200-2, 200-3) and may transmit to the cloud server 300 content that is associated with the second device's type. A further description of the method for transmitting a content will be provided below with reference to FIGS. 10A to 10B.

For example, when the second device 200 includes the personal devices 200-2, 200-3, a content which is suitable for user taste may be transmitted. Accordingly, a user may receive or be recommended only a content useful for the user.

Figure 10A:
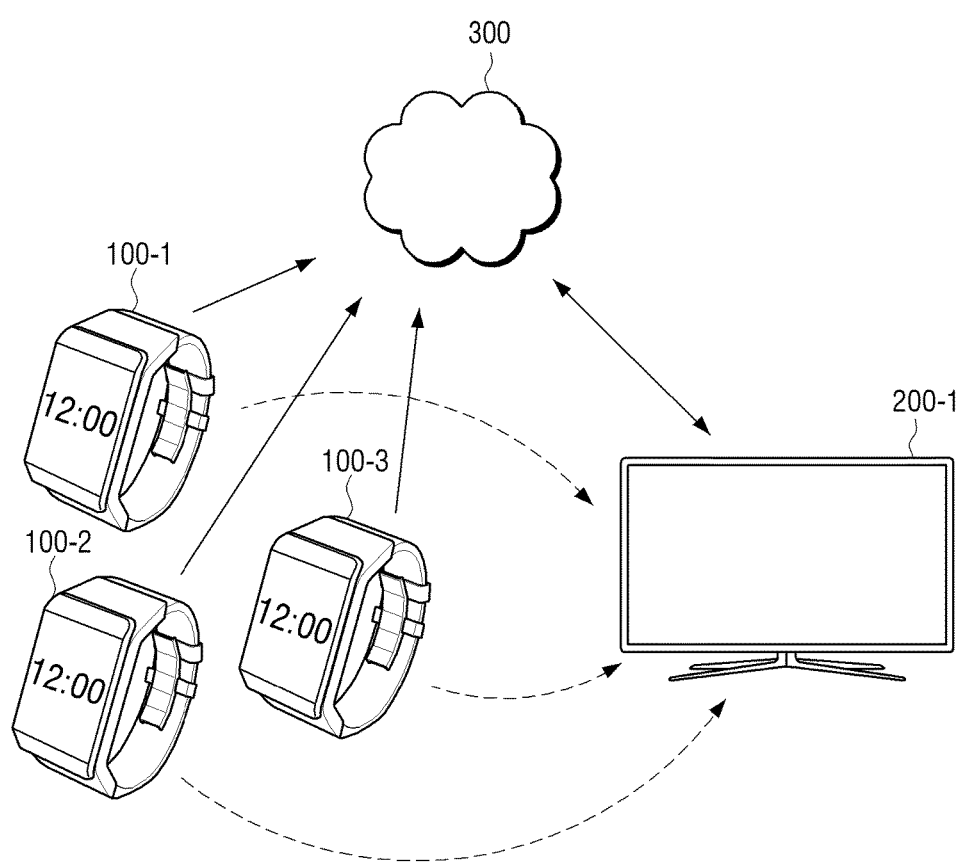
FIG. 10A is a diagram of an example of a system, according to an embodiment of the present disclosure.

FIG. 10A depicts a system in which a plurality of first devices 100-1, 100-2, 100-3 are connected to a second device 200-1. As illustrated in FIG. 10A, each of the plurality of first devices 100-1, 100-2, 100-3 may be connected to the second device, and a content and personal information of each of the plurality of first devices 100-1, 100-2, 100-3 may be transmitted to a cloud server 300.

Figure 10B:
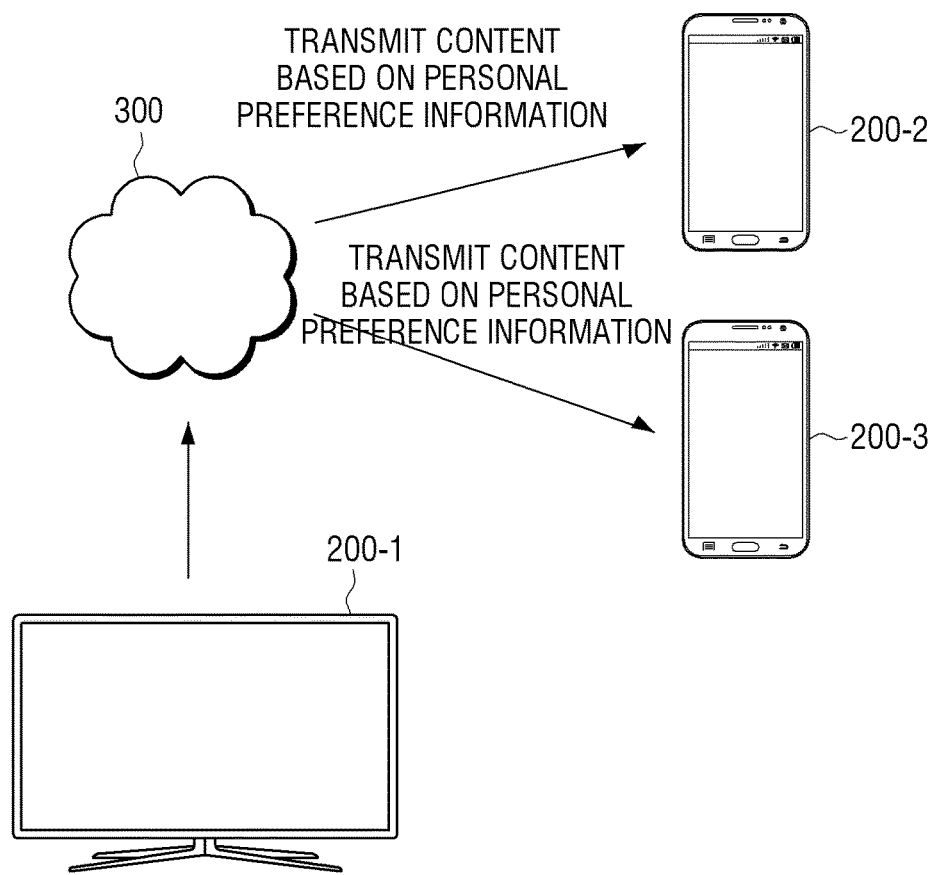
FIG. 10B is a diagram of an example of a system, according to an embodiment of the present disclosure.

FIG. 10B is a diagram of a system that implements a method for transmitting different contents to second devices 200-1, 200-2, 200-3 based on personal preference information. As illustrated in FIG. 10B, in response to the second devices 200-1, 200-2 being personal devices, the cloud server 300 may divide a stored content based on personal preference information associated with the respective user of each of the second devices 200-1, 200-2. In some implementations, the content may be divided by the cloud server 300. Alternatively, the content may be transmitted from the cloud server 300 to the second devices 200-1, 200-2 and divided by the second devices 200-1, 200-2.

Figure 10C:
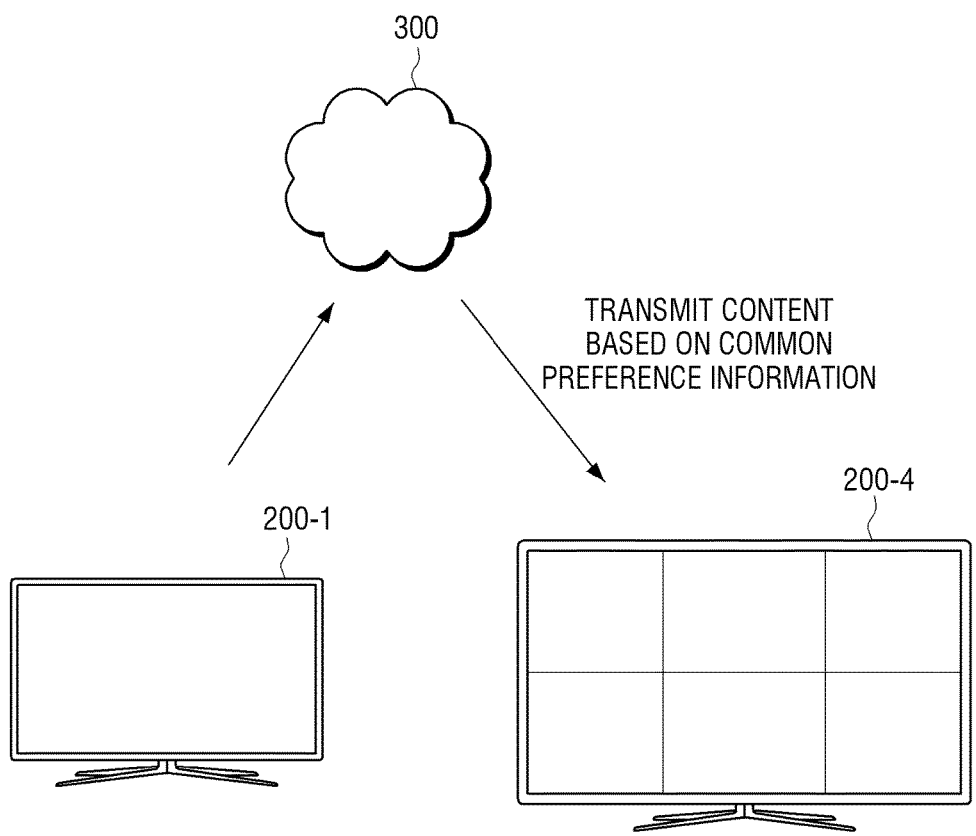
FIG. 10C is a diagram of an example of a system, according to an embodiment of the present disclosure.

FIG. 10C a diagram of a system that implements a method for transmitting a content to the second devices 200-1, 200-2, 200-3 based on common preference. As illustrated in FIG. 10C, in response to the second device 200-3 being a public device, common preference information may be identified based on the personal preference information. For example, the cloud server 300 may divide a stored content (e.g., a file, a data structure, and/or any other suitable type of content item) based on the common preference information. More particularly, the content may be divided by the cloud service 300 or in the second device 200-3.

Although in this example, the plurality of first devices 100-1, 100-2, 100-3 includes three devices, it is to be understood that in alternative implementations, the plurality may include any suitable number of devices.

Figure 11:
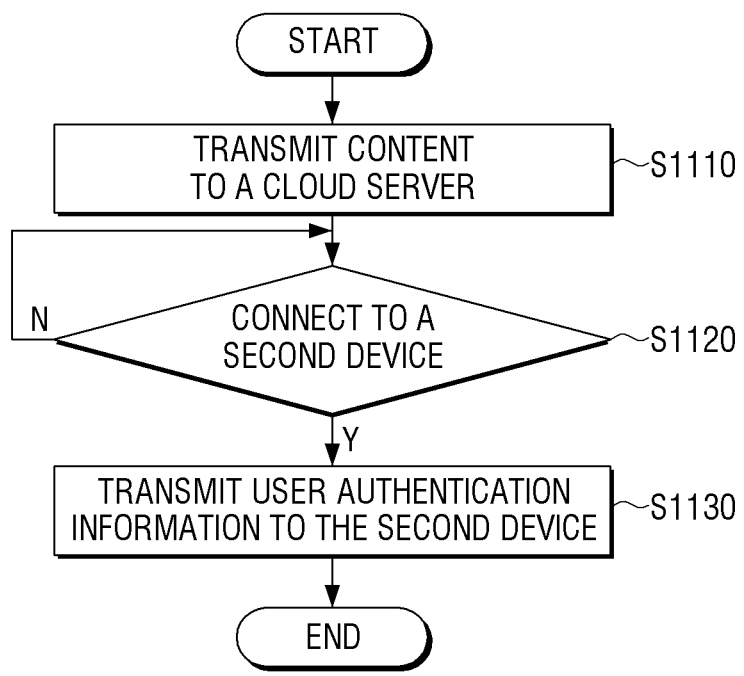
FIG. 11 is a flowchart of an example of a process, according to an embodiment of the present disclosure.

FIG. 11 is a flowchart of an example of a process, according to an embodiment of the present disclosure. According to the process, a first device 100 transmits content to a cloud server 300 in operation S1110. For example, the first device 100 may transmit the content to the cloud server 300 after passing through a user authentication process.

Whether the first device 100 is connected to a second device 200 is determined in operation S1120. For example, in response to the first device 100 approaching the second device 200 within a predetermined distance (for example, 10 meter, 20 meter, etc.), the connection between the first device 100 and the second device 200 may be established automatically.

In response to determining that the first device 100 is connected to the second device 200, user authentication information is transmitted to the second device 200 in operation S1130. Afterwards, the second device 200 may authenticate itself (or its user) with the cloud server 300 by using the transmitted user authentication information. In this manner, a user may easily share a content between the first device and the second device.

Figure 12:
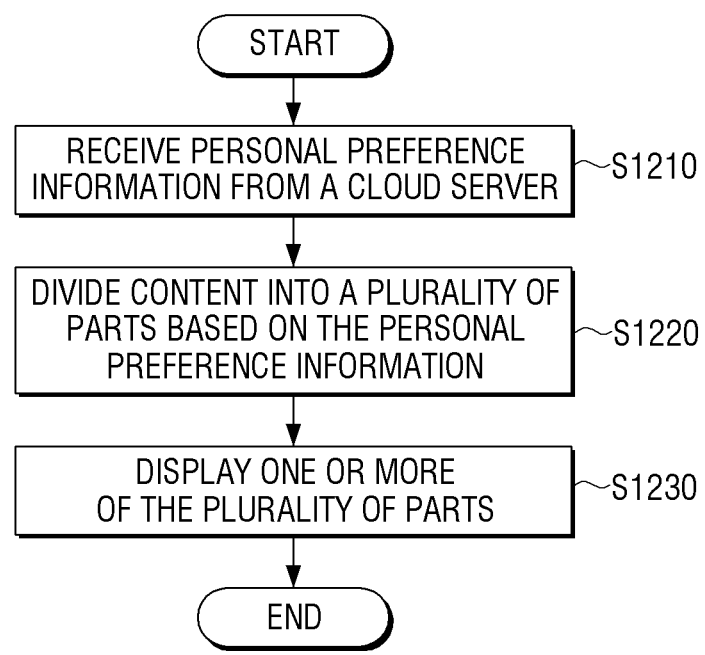
FIG. 12 is a flowchart of an example of a process, according to an embodiment of the present disclosure.

FIG. 12 is a flowchart of an example of a process, according to an embodiment of the present disclosure. According to the process, a second device 200 may receive personal preference information from a cloud server 300 in operation S1210 and may divide a content into a plurality of parts (e.g., a file, a data structure, and/or any other suitable type of content item or collection of content items) based on the received personal preference information in operation S1220. For example, the content may be divided by the second device 200 or may be divided by the cloud server 300 by using stored personal preference information. After the content is divided based on the personal preference information, one or more of the plurality of parts of the content are displayed in operation S1230.

Figure 13:
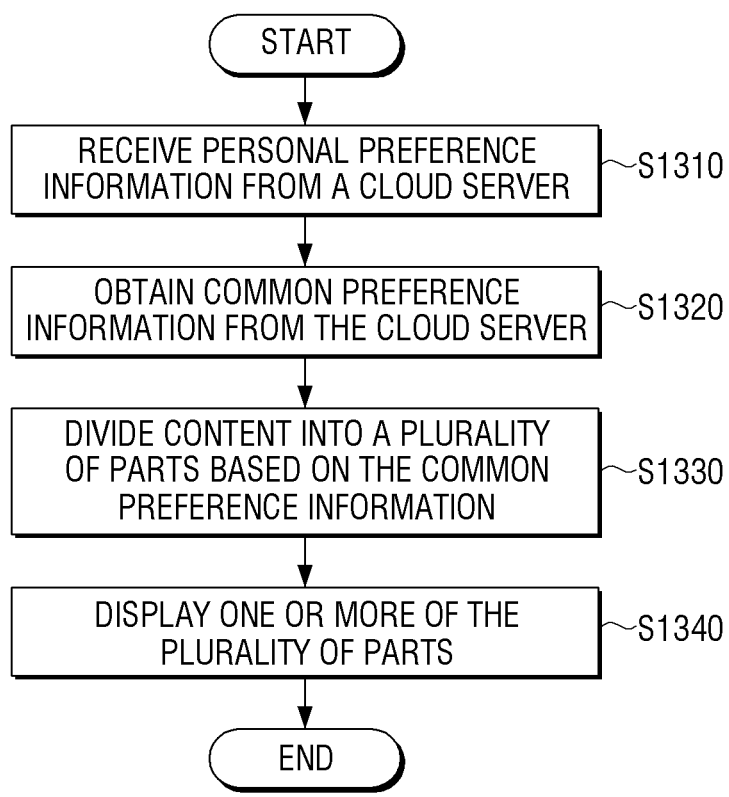
FIG. 13 is a flowchart of an example of a process, according to an embodiment of the present disclosure.

FIG. 13 is a flowchart of an example of a process, according to an embodiment of the present disclosure. According to the process, a second device 200 may receive personal preference information from a cloud server 300 in operation S1310 and obtain common preference information based on the received personal preference information in operation S1320. Afterwards, the second device 200 may divide a content (e.g., a file, a data structure, and/or any other suitable type of content item or collection of content items) into a plurality of parts based on the obtained common preference information in operation S1330. For example, the content may be divided by the second device 200. Additionally or alternatively, the common preference information may be identified in the cloud server 300 based on the stored personal preference information, and then the cloud server may divide the content based on the obtained common preference information.

After the content is divided based on the common preference information, one or more of the plurality of parts of the content may be displayed in operation S1340.

FIGS. 14-19 are sequence diagrams of different processes for sharing of content, according to various embodiments of the present disclosure.

Figure 14:
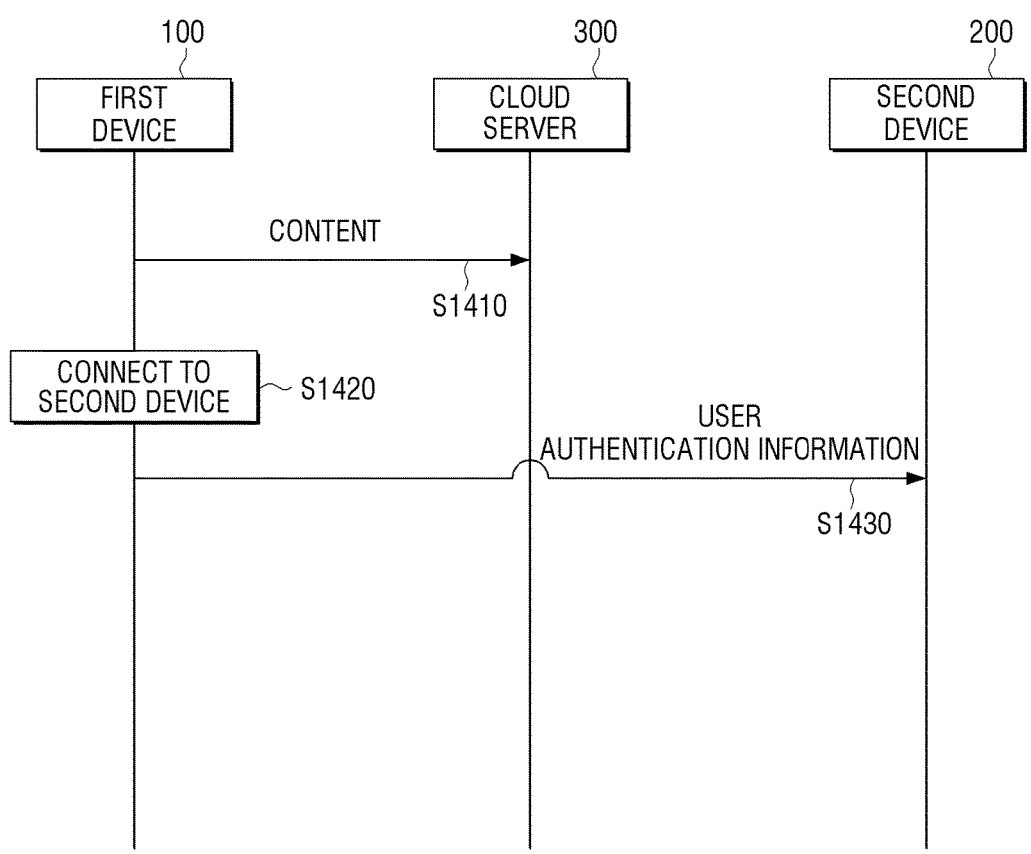
FIG. 14 is a flowchart of an example of a process, according to an embodiment of the present disclosure.

Referring to FIG. 14, a first device 100 transmits a content to a cloud server 300 in operation S1410. For example, the first device 100 may perform a user authentication process and then be connected to the cloud server 300. In response to detecting that the first device 100 is connected to a second device in operation S1420, the first device 100 may transmit user authentication information to the second device in operation S1430.

Figure 15:
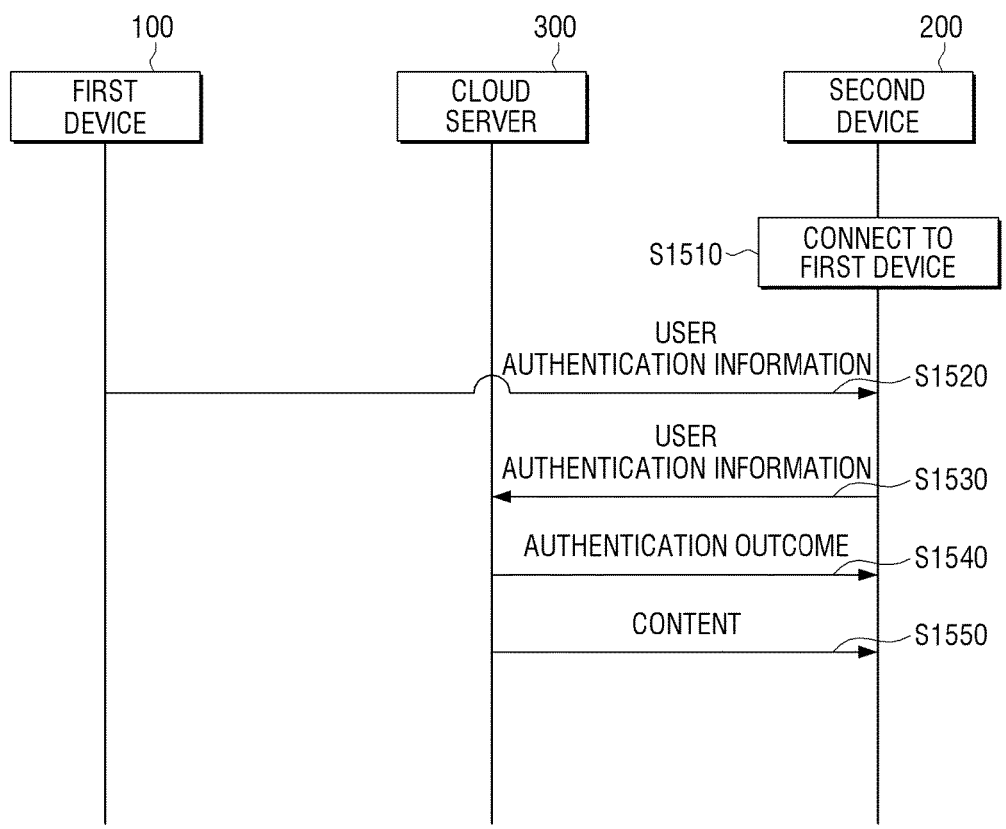
FIG. 15 is a flowchart of an example of a process, according to an embodiment of the present disclosure.

Referring to FIG. 15, in response to detecting that the second device 200 is connected to the first device 100 in operation S1510, the second device 200 receives user authentication information from the first device 100 in operation S1520. For example, the user authentication information may include user account information (for example, ID and password), user fingerprint information, and/or any other suitable type of information that can be used to authenticate a device and/or its user.

The second device 200 may transmit the received user authentication information to the cloud server 300 in operation S1530 and receive an indication of whether the second device has been successfully authenticated, in operation S1540. Upon completion of the user authentication, the second device 200 may receive a content from the cloud server 300 in operation S1550. Accordingly, the second device 200 may authenticate itself (or its user) with the cloud server 300 by using the transmitted user authentication information. In this manner, the user may easily share the content between the first device and the second device.

Figure 16:
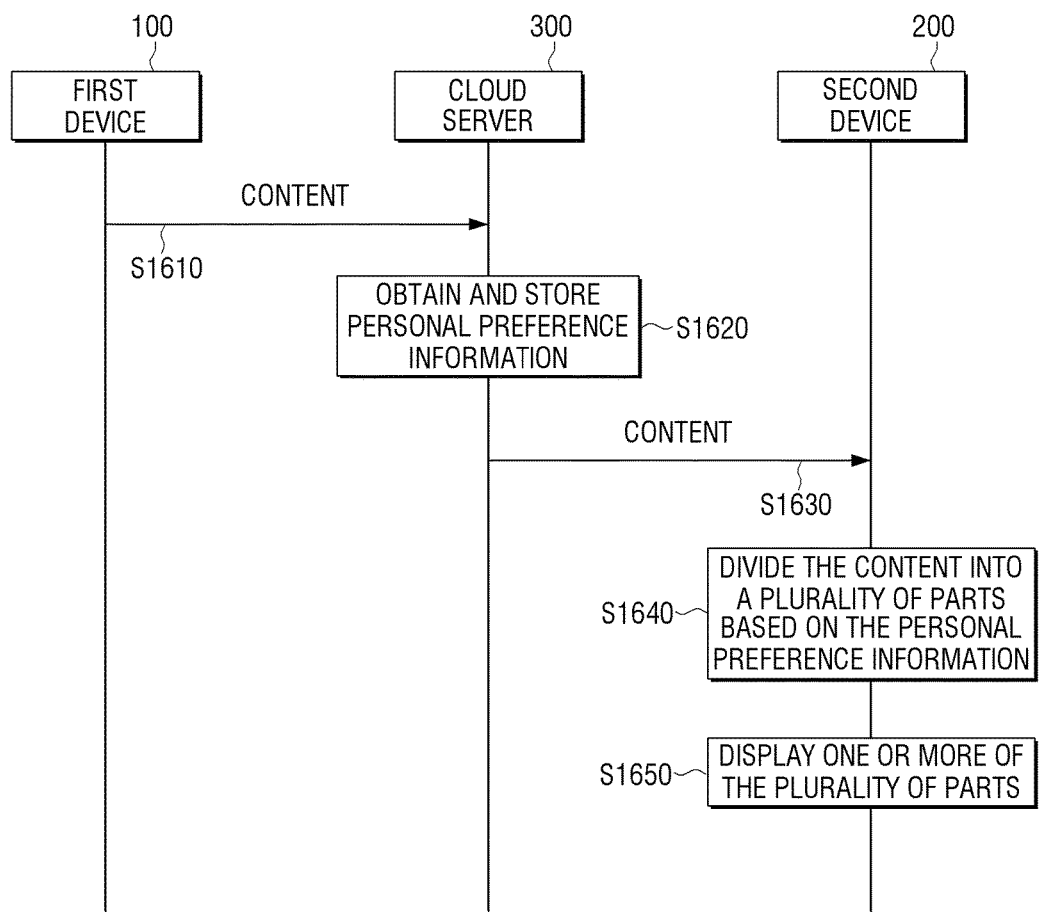
FIG. 16 is a sequence diagram of an example of a process, according to an embodiment of the present disclosure.

Referring to FIG. 16, the first device 100 may transmit a content (e.g., a file, a data structure, and/or any other suitable type of content item or collection of content items) to the cloud server 300 in operation S1610, and, embedded the content, the cloud server 300 may store personal preference information associated with a user of the first device 100, in operation S1620. The second device 200 may receive the personal preference information along with the content from cloud server 300 in operation S1630 and divide the content into a plurality of parts based on the personal preference information in operation S1640.

The second device 200 may display one or more of the plurality of parts of the content in operation S1650.

Figure 17:
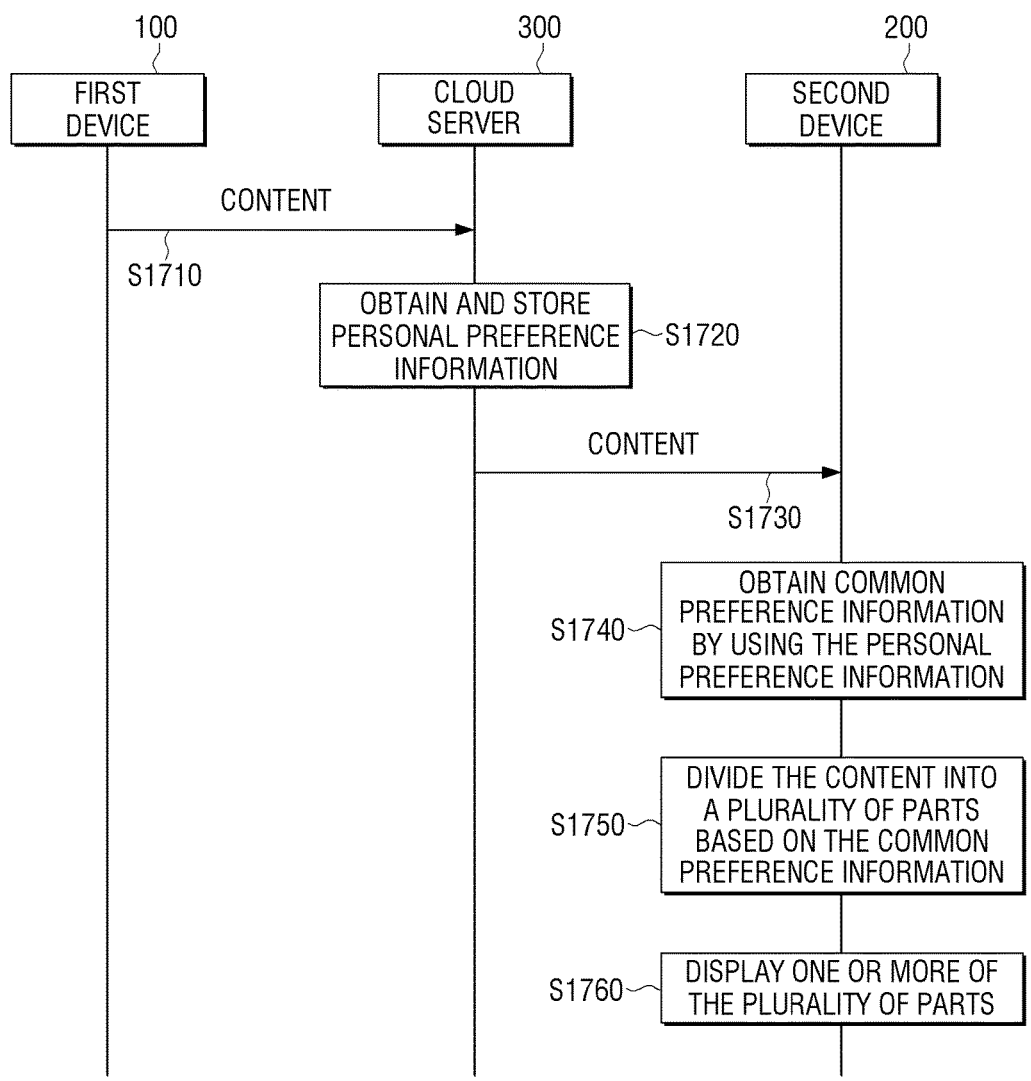
FIG. 17 is a sequence diagram of an example of a process, according to an embodiment of the present disclosure.

Referring to FIG. 17, the first device 100 may transmit a content (e.g., a file, a data structure, and/or any other suitable type of content item or collection of content items) to the cloud server 300 in operation S1710, and the cloud server 300 may store personal preference information associated with the content in operation S1720. The second device 200 may receive the personal preference information stored in the cloud server 300 in operation S1730 and obtain common preference information based on the personal preference information in operation S1740.

The second device 200 may divide the content into a plurality of parts based on the common preference information in operation S1750 and display one or more of the plurality of parts of the content in operation S1760.

Figure 18:
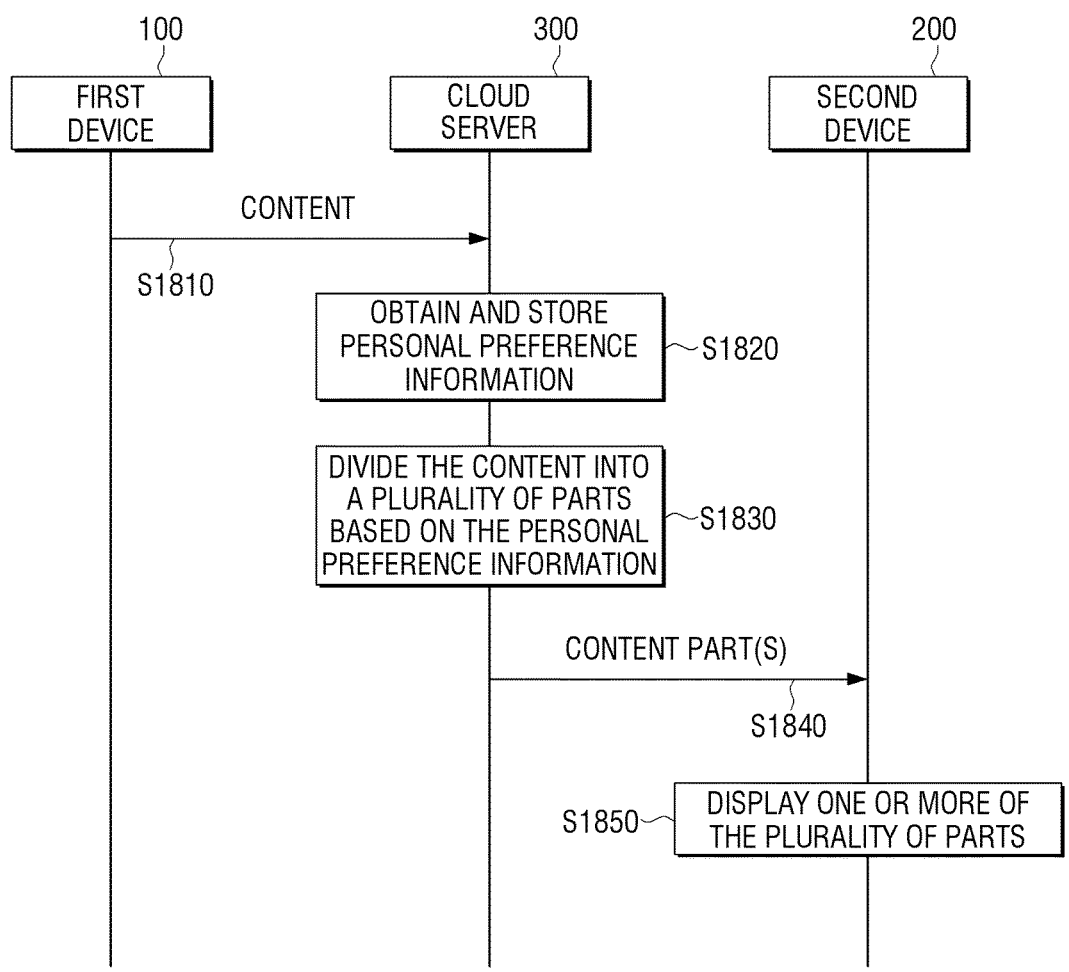
FIG. 18 is a sequence diagram of an example of a process, according to an embodiment of the present disclosure.

Referring to FIG. 18, the first device 100 may transmit a content (e.g., a file, a data structure, and/or any other suitable type of content item or collection of content items) to the cloud server 300 in operation S1810, and the cloud server 300 may identify stored personal preference information associated with the content in operation S1820. The cloud server 300 may divide the content into a plurality of parts based on the stored personal preference information in operation S1830 and transmit one or more of the plurality of parts of the content to the second device 200 in operation S1840. The second device 200 may display the one or more content parts on a display in operation S1850.

Figure 19:
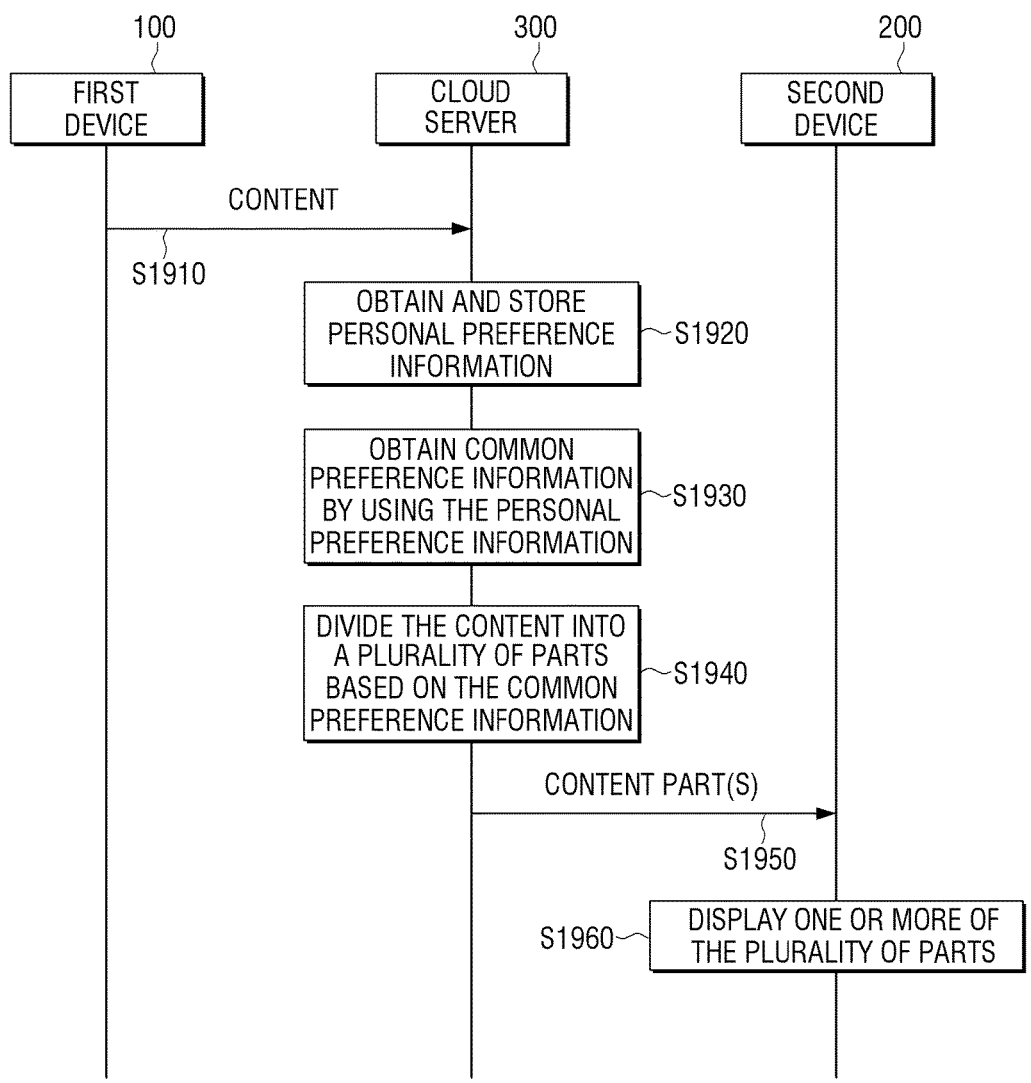
FIG. 19 is a sequence diagram of an example of a process, according to an embodiment of the present disclosure.

Referring to FIG. 19, the first device 100 may transmit a content (e.g., a file, a data structure, and/or any other suitable type of content item or collection of content items) to the cloud server 300 in operation S1910, and the cloud server 30 may store personal preference information in operation S1920. The cloud server 300 may extract common preference information based on the stored personal preference information in operation S1930 and divide the content into a plurality of parts based on the extracted common preference information in operation S1940. The cloud server 300 may transmit one or more of the plurality of parts of the content to the second device 200 in operation S1950. The second device 200 may display the content parts in the display in operation S1960.

FIGS. 1-19 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. It will be further understood that the terms "processor" and "controller" are used synonymously throughout the disclosure.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An end-user device comprising:
a communication interface; and
at least one processor,
wherein the at least one processor is configured to:
establish, via the communication interface, a first connection between the end-user device and an external end-user device;
receive, via the communication interface through the first connection, a password from the external end-user device, wherein the external end-user device is connected to a server, and the password is authenticated by the server to allow the external end-user device to access the server;
transmit, via the communication interface, the password from the end-user device to the server; and
establish, via the communication interface, a second connection between the end-user device and the server after the server authenticates the password transmitted from the end-user device,
wherein the first connection between the end-user device and the external end-user device is established in response to detecting that a distance between the end-user device and the external end-user device is less than a threshold.

2. The end-user device as claimed in claim 1, further comprising:
a display configured to display a content,
wherein the at least one processor is further configured to:
transmit a request for content to the server after establishing the second connection between the end-user device and the serve;
receive the content from the server; and
control the display to display the content.

3. The end-user device as claimed in claim 2, wherein the at least one processor is further configured to:
receive, from the server, personal information associated with a user; and
control the display to display the personal information,
wherein, when the external end-user device includes a plurality of sub-devices:
the personal information includes a plurality of personal information items, such that each information item is associated with a different one of the sub-devices, and
the personal information items are displayed concurrently on the display.

4. The end-user device as claimed in claim 2, wherein the at least one processor is further configured to:
receive, from the server, personal preference information; and
divides the content into a plurality of parts based on the personal preference information,
wherein displaying the content includes displaying one or more of the plurality of parts.

5. The end-user device as claimed in claim 2, wherein the at least one processor is further configured to:
receive personal preference information from the server;
obtain common preference information based on the personal preference information; and
divides the content into a plurality of content groups based on the common preference information;

wherein displaying the content includes displaying at least one content group among the plurality of content groups corresponding to the common preference information.

6. A end-user device comprising:
a communication interface; and
at least one processor configured to:
  transmit, via the communication interface, a password from the end-user device to a server, wherein the password is authenticated by the server to allow the end-user device to access the server;
  establish, via the communication interface, a first connection between the end-user device and the server after the server authenticates the password transmitted from the end-user device;
  establish, via the communication interface, a second connection between the end-user device and an external end-user device; and
  transmit, via the communication interface through the second connection, the password from the end-user device to the external end-user device, so as to enable the external end-user device to access the server using the password,
wherein the second connection between the end-user device and the external end-user device is established in response to detecting that a distance between the end-user device and the external end-user device is less than a threshold.

7. The end-user device as claimed in claim 6, wherein the at least one processor is further configured to transmit, via the communication interface, at least one of pre-stored content and personal information to the external end-user device after establishing the second connection between the end-user device and the external end-user device.

8. A method for connecting with a server, comprising:
establishing a first connection between a first end-user device a second end-user device;
receiving, by the first end-user device through the first connection, a password from the second end-user device, wherein the second end-user device is connected to the server, and the password is authenticated by the server to allow the second end-user device to access the server;
transmitting, by the first end-user device, the password from the first end-user device to the server; and
establishing, by the first end-user device, a second connection between the first end-user device and the server after the server authenticates the password transmitted from the first end-user device,
wherein the first connection between the first end-user device and the second end-user device is established in response to a distance between the first end-user device and the second end-user device being shorter than a threshold distance.

9. The method as claimed in claim 8, further comprising:
receiving, by the first end-user device, a content that is transmitted by the server after the second connection between the first end-user device and the service is established; and
displaying the content on a display of the first end-user device.

10. The method as claimed in claim 9, further comprising:
receiving personal information from the server; and
displaying the personal information on the display of the first end-user device,
wherein, when the second end-user device includes a plurality of sub-devices:
  the personal information includes a plurality of personal information items, such that each information item is associated with a different one of the sub-devices, and
  the personal information items are displayed concurrently on the display.

11. The method as claimed in claim 9, further comprising:
receiving, by the first end-user device, personal preference information transmitted by the server; and
dividing the content into a plurality of parts based on the personal preference information,
wherein displaying the content comprises displaying one or more of the plurality of parts.

12. The method as claimed in claim 9, further comprising:
receiving, by the first end-user device, personal preference information transmitted by the server;
obtaining common preference information based on the personal preference information; and
dividing the content into a plurality of content groups based on the common preference information,
wherein displaying the content comprises displaying at least one content group among the plurality of content group corresponding to the common preference information.

13. A method for connecting with a server, the method comprising:
transmitting a password from a first end-user device to the server, wherein the password is authenticated by the server to allow the first end-user device to access the server;
establishing a first connection between the first end-user device and the server after the server authenticates the password transmitted from the first end-user device;
establishing a second connection between the first end-user device and a second end-user device; and
transmitting, through the second connection, the password from the first end-user device to the second end-user device, so as to enable the second end-user device to access the server using the password,
wherein the second connection between the first end-user device and the second end-user device is established in response to detecting that a distance between the first end-user device and the second end-user device is shorter than a threshold distance.

14. The method as claimed in claim 13, further comprising transmitting at least one of pre-stored content and personal information from the first end-user device to the second end-user device.

15. A system comprising a first end-user device, a second end-user device, and a server, wherein:
the first end-user device is configured to:
  transmit a password from the first end-user device to the server, wherein the password is authenticated by the server to allow the first end-user device to access the server;
  establish a first connection between the first end-user device and the server after the server authenticates the password transmitted from the first end-user device;
  establish a second connection between the first end-user device and the second end-user device; and
  transmit, through the second connection, the password to the second end-user device, so as to enable the second end-user device to access the server using the password; and
the second end-user device is configured to:
  receive, through the second connection, the password from the first end-user device;

transmit the password to the server; and establish a third connection between the second end-user device and the server after the server authenticates the password transmitted from the second end-user device, wherein the second connection between the first end-user device and the second end-user device is established in response to detecting that a distance between the first end-user device and the second end-user device is shorter than a threshold distance.

16. A non-transitory computer-readable medium storing one or more processor-executable instructions, which when executed by at least one processor, cause the at least one processor to execute a process comprising:

establishing a first connection between a first end-user device and a second end-user device;

receiving, by the first end-user device through the first connection, a password from the second end-user device, wherein the second end-user device is connected to a server, and the password is authenticated by the server to allow the second end-user device to access the server;

transmitting, by the first end-user device, the password from the first end-user device to the server; and establishing, by the first end-user device, a second connection between the first end-user device and the server after the server authenticates the password transmitted from the first end-user device, wherein the second connection between the first end-user device and the second end-user device is established in response to detecting that a distance between the first end-user device and the second end-user device is shorter than a threshold distance.

* * * * *